Aug. 9, 1966    H. BÜHLER    3,266,032
SAFETY APPARATUS FOR VEHICLE OPERATED BY ONE PERSON
Filed Nov. 20, 1962    2 Sheets-Sheet 1
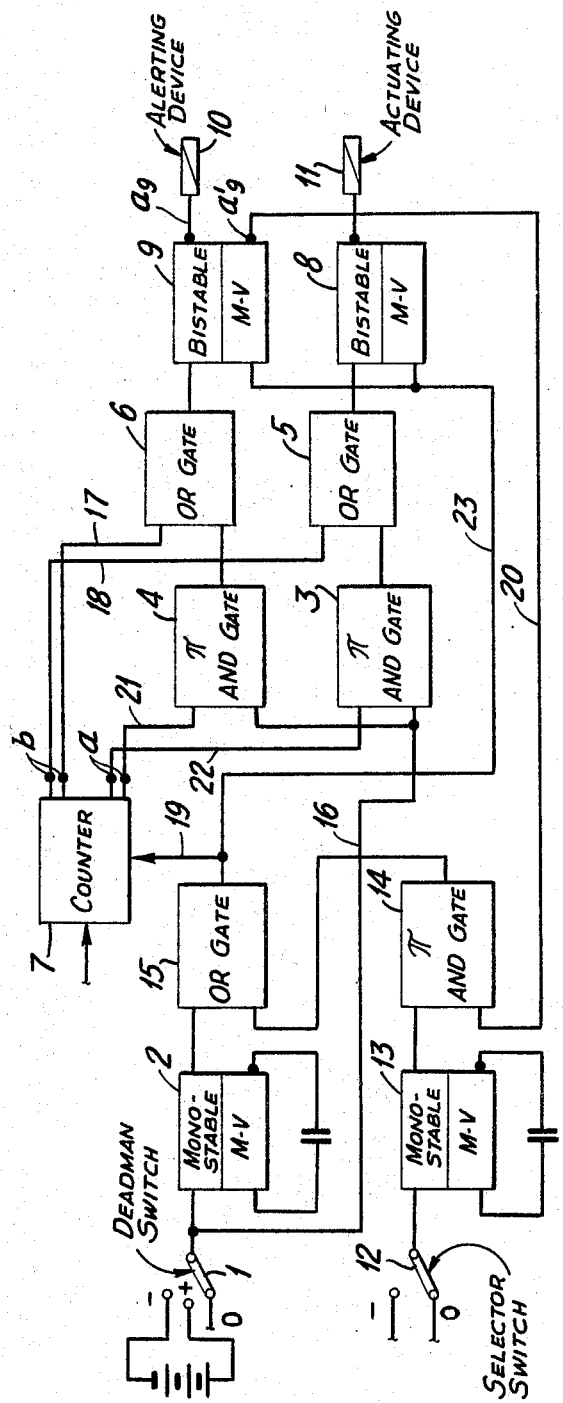
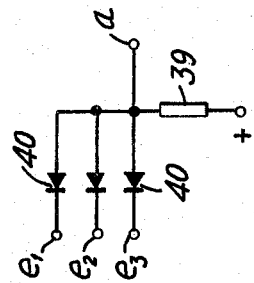
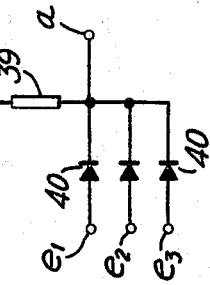
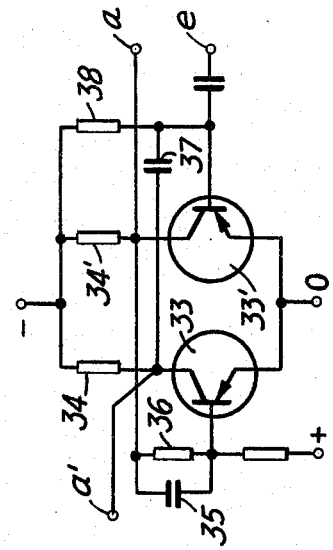
INVENTOR.
HANSRUDI BÜHLER
BY
McGlew & Toren
ATTORNEYS United States Patent Office 3,266,032
Patented August 9, 1966

3,266,032
SAFETY APPARATUS FOR VEHICLE OPERATED BY ONE PERSON
Hansrüdi Bühler, Wallisellen, Switzerland, assignor to Maschinenfabrik Oerlikon, Zurich, Switzerland
Filed Nov. 20, 1962, Ser. No. 238,868
Claims priority, application Switzerland, Nov. 24, 1961, 13,692/61
3 Claims. (Cl. 340—286)

This invention pertains, in general, to systems and apparatus for controlling the speed of vehicles; and, in particular, to a system and apparatus wherein alerting signals and control activity can be effected slowly or rapidly in order to supervise the alertness of the motorman and to safely decrease the speed of, and stop, a vehicle.

Although the system and apparatus of the present invention is hereinafter described with reference to vehicles which are constrained to travel on rails (which may be a conventional double-rail track or a monorail track) it is to be understood that the application of the present system and apparatus is not limited to vehicles constrained to travel on rails. The system and apparatus provided by the present invention is equally applicable and useful in connection with highway travelling motor vehicles.

Presently known safety systems for rail-travelling vehicles operated by one man employ the so-called "deadman" switch feature; i.e., a switch device (the "deadman" switch) is coupled with a pedal, or lever, which is intended to be operated continuously by the motorman. But, if the motorman, due to physical or mental incapacity, has released his hold on the pedal, or lever, for a certain amount of time, the "deadman" switch, being actuated, disconnects the vehicle's prime mover and actuates braking devices in order to slow the speed of, and ultimately stop, the vehicle.

In addition, for the purpose of enhancing safety, supervisory systems are incorporated with the "deadman" switch to check the alertness of the motorman. For example, one method of supervising the alertness of the motorman is to require him to actuate the "deadman" switch, temporarily, and inactivate it, subsequently, in order to cause a safety system controlled by the "deadman" switch to be returned to a normal condition, so that the safety system resumes its control function. If the operator does not perform the actuating and inactivating operation within the required amount of time, there will occur warning, or alerting, signals and the initiation of action to disconnect the vehicle's prime mover and apply the brakes to the vehicle. As long as the operator inactivates the "deadman" switch, optical and/or accoustical signals occur which serve to check his alertness. When the vehicle is travelling at slow speed and when the "deadman" switch is inactivated, these alertness-checking signals occur very rapidly and the braking and stopping of the vehicle is effected abruptly.

The presently known mechanical safety systems employing the "deadman" switch feature and supervisory control are seriously deficient in that they do not insure sufficient safety; they require frequent maintenance, both preventive maintenance and corrective maintenance; and, the various parts thereof are subject to wear.

One object of the present invention is to provide a system for the safe and timely control of travelling vehicles, especially such vehicles which are operated by but one person.

Another object of the present invention is to provide a speed control system and supervisory system for travelling vehicles.

Another object of the present invention is to provide a vehicle-controlling system and an operator supervisory system requiring a minimum number of mechanical elements.

Another object of the present invention is to provide means for accomplishing the aforementioned objects simply, reliably and economically.

According to one embodiment of the present invention, there is provided safety apparatus for a vehicle wherein logic switching circuitry is employed to actuate a counter which is capable of counting slowly and quickly. The counter is controlled by the logic switching circuitry such that its counting may be changed from a slow speed counting to a high speed counting in order to hasten the actuation of alerting signal means and actuators for braking and stopping the travelling vehicle.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a block diagram of the speed-controlling and supervisory system according to one embodiment of the invention;

FIG. 2 is a schematic diagram of a multivibrator circuit representative of those employed in the embodiments of the invention illustrated at FIGS. 1 and 5;

FIG. 3 is a schematic diagram of an AND gate representative of those employed in the embodiments of the invention illustrated at FIGS. 1 and 5;

FIG. 4 is a schematic diagram of an OR gate representative of those employed in the embodiments of the invention illustrated at FIGS. 1 and 5;

Figure 5:
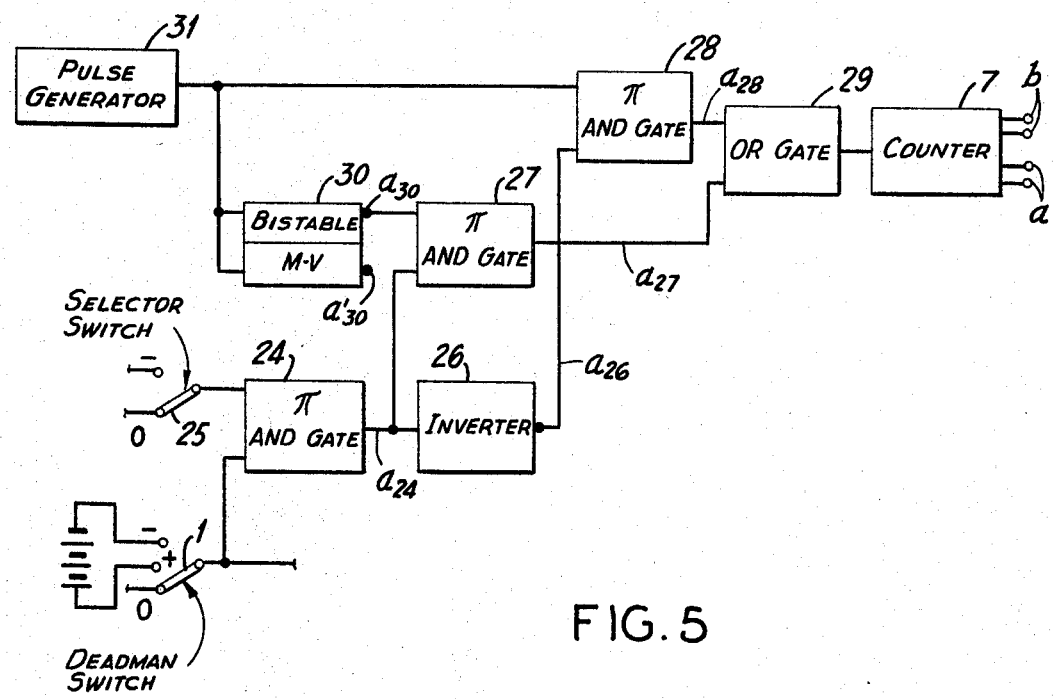
FIG. 5 is a block diagram of another embodiment of the invention.

Before discussing the structure and function of the invention according to the block diagram illustrated at FIG. 1, it will be helpful to first explain with respect to FIGS. 2, 3 and 4 the basic logic switching elements employed; i.e., a monostable multivibrator, a bistable multivibrator, an AND gate and an OR gate.

FIG. 2 is a schematic diagram of a multivibrator circuit. (FIG. 2 will be used for the purpose of explaining the operaiton of both a monostable multivibrator and a bistable multivibrator.) The monostable multivibrator shown at FIG. 2 has two transistors 33 and 33'. The emitter electrodes of the transistors 33 and 33' are directly connected with each other at terminal 0. The collector electrodes of the transistors 33 and 33' are connected together through the resistors 34 and 34', respectively, to a source of negative potential, as shown. Being unsymmetrically coupled, the multivibrator operation is monostable. Normally, the transistor 33' is conductive. But transistor 33' can be blocked by introducing a positive voltage pulse at the terminal $e$. The transistor 33 then becomes conductive via the feedback coupling represented by the capacitor 35 and the resistor 36. Subsequently, the capacitor 37 is charged so that, after a predetermined time, the monostable multivibrator reverts to its normal condition; i.e., the transistor 33' is conductive and the transistor 33 becomes non-conductive. For convenience, the non-conductive condition with respect to output terminals of the various circuit components comprising the system of the present invention is hereinafter designated as condition 0; the conductive condition being designated as condition 1. For example, in FIG. 2, $a=0$ and $a'=1$; 1 being a predetermined negative potential. When a positive voltage pulse is introduced at terminal $e$, the normal condition of the monostable multivibrator is changed such that $a=1$ and $a'=0$. After a time which is determined by the RC circuit (resistor 38 and capacitor 37) the monostable mutivibrator reverts to its normal condition; i.e., $a=0$ and $a'=1$.

A bistable multivibrator is arranged similarly to the monostable multivibrator; but, the bistable multivibrator has symmetrical feedback couplings and thus has two stable conditions, rather than one stable condition as in the case of the monostable multivibrator. As is known, one input pulse will change the bistable multivibrator from a first stable condition to a second stable condition; but, another input pulse is required to change the bistable multivibrator from the second stable condition back to the first stable condition. For convenience, the first stable condition of the bistable multivibrator is called the normal condition, the normal condition being $a=0$ and $a'=1$; and, the second bistable condition is such that $a=1$ and $a'=0$.

FIG. 3 is a schematic diagram of an AND gate. Three diodes 40 are coupled in parallel between the terminals $e1$, $e2$ and $e3$ and one terminal of the resistor 39. As is known, only when all of the input terminals $e1$, $e2$ and $e3$ have a negative potential introduced thereto no current flows through the resistor 39 and thus the potential at the output terminal $a$ is designated as 1; i.e., $a=1$. However, if the potential at any one or two of the input terminals is 0, current flows through the resistor 39 and the potential at the output terminal $a$ is also at 0 potential; i.e., $a=0$. Accordingly, as is well known, at the termina $a$ of the AND gate of FIG. 3 there will occur a signal ($a=1$) only when all of the input terminals $e1$, $e2$ and $e3$ have input signal pulses introduced thereto simultaneously.

At FIG. 4 there is illustrated in schematic form an OR gate. Three diodes 40 are coupled in parallel between three input terminals $e1$, $e2$ and $e3$ and one terminal of the resistor 39. At the other end of the resistor 39 there is introduced a positive potential (indicated by the + sign at FIG. 4). Accordingly, terminal $a$ is at the potential condition such that $a=1$ only if there exists a negative voltage at any of the input terminals $e1$, $e2$ or $e3$.

In the embodiment according to FIG. 1, there is shown a "deadman" switch 1 which, as shown, may be selectively connected to a source of 0 potential, a source of positive potential, or a source of negative potential (the potential sources are not illustrated in the drawing figure). The "deadman" switch 1, as is well known, is coupled to a controller or safety device (not shown) such as a pedal or lever which, during normal operation of the vehicle, is continuously operated by the motorman. As long as the motorman is continuously actuating the controller or safety device, the "deadman" switch 1 is in the position indicated at FIG. 1. The "deadman" switch 1 is, as shown, coupled with an input of a monostable multivibrator 2 and, in addition, via the conductor means 16 with one input of each of the AND gates 3 and 4. The output of these AND gates 3 and 4 are connected to one input of the OR gates 5 and 6, respectively.

There is also provided a counter 7 which may comprise a number of logic switching elements arranged in a manner well known in the art. At the input (indicated by the arrow) of the counter 7 there are introduced a train of signal pulses. The appearance of each signal pulse at the input represents a predetermined elapsed distance; e.g., 50 feet. The counter 7 has two pairs of output terminals $a$, $a$ and $b$, $b$. As shown, the conductor means 21 is coupled between one of the output terminals $a$ of the counter 7 and another input of the AND gate 4. Similarly, another conductor means 22 is coupled between the other output terminal $a$ of the counter 7 and another input of the AND gate 3. As shown, a conductor means 17 is connected between one of the terminals $b$ of the counter 7 and one of the inputs of the OR gate 6. Similarly, another conductor means 18 is connected between the other output terminal $b$ of the counter 7 and the other input of the OR gate 5.

Two bistable multivibrators 8 and 9 are provided. Each bistable multivibrator 8 or 9 has two inputs. The outputs of the OR gates 5 and 6 are coupled to an input of the bistable multivibrators 8 and 9, respectively. The output of the bistable multivibrator 8, as shown, is connected to an actuating device 11 which may, for example, be a main switch which is connected to the vehicle's prime mover and an electromagnetic brake which is actuatable for slowing the vehicle and ultimately bringing it to a stop. The output designated as $a9$ of the bistable multivibrator 9 is connected to an alerting device 10, or warning device, such as a bell, a horn or a light. Another output designated as $a'9$ of the bistable multivibrator 9 is connected via the conductor means 20 to one input of an AND gate 14. The other input to the AND gate 14 is connected with an output of another monostable multivibrator 13, as shown. The output of the AND gate 14 is connected to one input of another OR gate 15. Another input of the OR gate 15 is, as shown, connected with the output of the monostable multivibrator 2. The output of the OR gate 15 is connected, via the conductor means 19, to an input of the counter 7 and, in addition, is connected via the conductor means 23 to the other inputs of the bistable multivibrators 8 and 9. An additional switch 12, as shown, is connected with the input of the monostable multivibrator 13. The additional switch 12 can selectively make contact with either of two potentials. (The sources of these potentials are not shown in the drawing figures.) The functioning and purpose of the additional switch 12 is explained in greater detail hereinafter.

As long as the motorman is continuously actuating the safety device (not shown; e.g., a control pedal or lever), the "deadman" switch 1 is in the position indicated at FIG. 1. Accordingly, via the conductor means 16, there is introduced to one input of each of the AND gates 3 and 4 a potential designated as $a=0$. Since the potential $a=0$ is introduced to the input of the AND gates 3 and 4, signals arriving from the counter 7, via the conductor means 22 and 21 cause the AND gates 3 and 4, respectively, to be blocked.

When the vehicle has traversed a predetermined distance on its path, a signal from terminal $b$ of the counter 7 is introduced into an input of the OR gate 6 via the conductor means 17. Accordingly, the output from the OR gate 6 is introduced to one of the inputs of the bistable multivibrator 9 causing this multivibrator to "flip" so that the potential at the outputs $a9$ and $a'9$ is changed; i.e., $a9$ and $a'9$ change such that $a9=1$ and $a'9=0$. Since $a9=1$, the alerting device 10 is actuated.

In the event that the motorman does not heed the alerting signal provided by the warning device 10, the bistable multivibrator 8 will provide an output signal to energize the actuating device 11 due to another counter signal introduced into the input of the OR gate 5 via the conductor means 18; the OR gate 5 providing an output signal which is fed into one of the inputs of the bistable multivibrator 8. By means of a suitable delay means it is possible to delay the braking of the vehicle until a short time after a main switch connected to the vehicle's prime mover has been opened.

The above described operation takes place slowly. With the vehicle travelling at a high rate of speed the pulses at terminal $b$ emanating from the counter 7 are in such sequence as to provide the motorman with only warning signals via the alerting device 10 and, in addition, gradual operation of a safety device to which the "deadman" switch 1 is coupled.

The motorman can prevent the actuation of the devices 10 and 11 by means of the "deadman" switch 1 and the additional switch 12. The motorman can temporarily release the safety device, thus causing the "deadman" switch 1 to come in contact with the positive potential contact. Accordingly, a positive potential pulse is introduced into the input of the monostable multivibrator 2 causing it to "flip." Consequently, an output signal from the OR gate 15 is introduced into an input of the counter 7, thus causing a resetting of the counter before it has had time to exercise its control function. Similarly, the counter 7 can be reset by virtue of the circuit comprising the additional switch means 12, the monostable multivibrator 13, the AND gate 14 and the OR gate 15. However, in the event that the warning signal 10 has already responded, a signal ($a'9=0$) is introduced into one of the inputs of the AND gate 14 via the conductor means 20. Accordingly, output signals from the monostable multivibrator 13 are blocked. Thus, only the "deadman" switch 1, when it is returned to the condition shown at FIG. 1, is effective to reset the counter. Of course, the return of the "deadman" switch 1 indicates that the motorman is again operating the safety device; e.g., a foot pedal or other control lever. Accordingly, by blocking the AND gate 14, as hereinbefore described, there is prevented an unnecessary disconnection of the warning signal means 10.

In the event that the motorman releases the safety device for too prolonged duration of time, the counter 7 influences the warning and actuator devices 10 and 11 via the conductor means 21 and 22 so that they respond quickly to provide alerting and braking signals and ultimate stoppage of the vehicle. This action occurs because there is a negative potential introduced via the conductor means 16 to an input of the AND gates 3 and 4. By virtue of signals via the conductor means 23, a change of the conditions of the bistable multivibrators 8 and 9 is made possible such that $a9=0$ and $a'9=1$.

FIG. 5 shows another embodiment of the invention. The components illustrated in block diagram in FIG. 5 are intended to be used in conjunction with the system shown in FIG. 1. However, for the purpose of clarity, all elements of FIG. 1 except the "deadman" switch 1 and counter 7 have been omitted. In the embodiment shown at FIG. 5, an AND gate 24 has one of its inputs connected with the "deadman" switch 1 and the other of its inputs connected to an additional selector switch 25. The additional selector switch 25 can, as indicated, be coupled selectively with either a source of 0 potential or a source of negative potential. (The sources of these potentials are not illustrated in the drawing figure.) The output $a24$ of the AND gate 24 is connected to an input of an inverter 26 (FIG. 6) and, in addition to an input of another AND gate 27. The output $a26$ of the inverter 26 is coupled with an input of another AND gate 28. The other input of the AND gate 28 is connected with the output of a pulse generator 31. In addition, the output of the pulse generator 31 is connected to the inputs of a bistable multivibrator 30. The output $a30$ of the bistable multivibrator 30 is connected to another input of the AND gate 27. The outputs $a27$ and $a28$ of the AND gates 27 and 28, respectively, are coupled with the input of an OR gate 29. The output of the OR gate 29 is coupled to the input of the counter 7.

Figure 6:
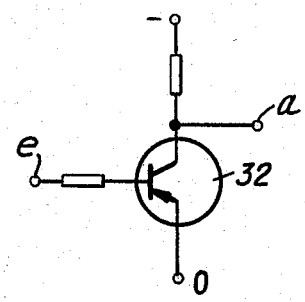
FIG. 6 is a schematic diagram of an inverter circuit employed in the embodiment of the invention illustrated at FIG. 5.

A reference, momentarily, to FIG. 6 will provide an appreciation of an inverter circuit which can be used for the inverter 26 shown at FIG. 5. When there is a negative voltage introduced at the input terminal $e$ of the transistor 32, the transistor becomes conductive and the output at terminal $a$ (which is at the collector electrode of the transistor 21) becomes 0; i.e., $a=0$. However, if there is introduced at the input terminal $e$, a 0 potential, then $a=1$.

As long as the motorman is operating the safety device to which the "deadman" switch 1 is coupled the following potential conditions prevail in the circuitry according to FIG. 5: $a24=0$, $a27=0$, and $a26=1$. Pulses generated by the pulse generator 31, therefore, are enabled to pass through the AND gate 28 and through the OR gate 29 to the input of the counter 7.

However, when the "deadman" switch 1 is released (the safety device controlled by the motorman is released) and the selector switch 25 is selectively moved into engagement with the negative potential contact, $a24=1$, $a26=0$ and $a28=0$. The pulses emanating from the pulse generator 31 pass through the bistable multivibrator 30, the AND gate 27 and the OR gate 29 to the input of the counter 7. Since the two inputs to the bistable multivibrator 30 arrive simultaneously, each pulse from the pulse generator changes the condition of the bistable multivibrator 30 at the output $a30$. Accordingly, only half of the pulses emanating from the pulse generator 31 are conducted to the input of the counter 7. In this manner, when the vehicle is travelling at a relatively high speed and abrupt response of the warning and actuating devices 10 and 11 (FIG. 1) is prevented when the "dead man" switch is temporarily released. Of course, instead of introducing only half of the pulses generated by the pulse generator 31 to the counter 7, frequency dividing circuits other than the bistable multivibrator 30 may be used to provide an even greater reduction in the number of pulses introduced to the input of counter 7.

It is preferred, in order to make the safety circuitry, hereinbefore described, rugged to embed the various logic elements in a hardened plastic insulating compound such as an epoxy resin, or the like.

While specific embodiments of the invention have been shown and described in detail to illustrate the application of the inventive principles, it will be understood that the invention may be embodied otherwise without departing from such principles.

What is claimed is:

1. Combined vehicle controlling and motorman alertness supervisory system comprising: a first monostable multivibrator having an input terminal and an output terminal; a first voltage source having different voltage polarity terminals; first switch means for connecting any one of said different voltage polarity terminals of said first voltage source to said input terminal of said first monostable multivibrator; first and second AND gates, each having two input terminals and an output terminal; first conductor means connected between said first switch means and one input of each of said first and second AND gates; a first OR gate having two input terminals and an output terminal, one input terminal being connected to said output terminal of said first monostable multivibrator; counter means including an input terminal and two output terminal means, one output terminal means providing slow count signals and the other output terminal means providing rapid count signals, the output terminal of said first OR gate being connected to the input terminal means of said counter means, said one output terminal means of said counter means being connected to one input terminal of each of said first and second AND gates; second and third OR gates, each having two input terminals and an output terminal, one of the input terminals of each said second and third OR gate being connected to said other output terminal means of said counter means, the other of the input terminals of each said second and third OR gates being connected with the output terminal of said first and second AND gates, respectively; first and second bistable multivibrators, each having two input terminals, the first bistable multivibrator having two output terminals and the second bistable multivibrator having one output terminal, said output terminals of each of said second and third OR gate being connected to one input terminal of the first and second bistable multivibrators, respectively; second conductor means connected between said output terminal of said first OR gate and another input terminal of each said first and second bistable multivibrator; alerting means connected to one output terminal of said first bistable multivibrator; actuating means for retarding the speed of the vehicle connected to said one output terminal if said second bistable multivibrator; a second voltage source having different voltage polarity terminals; a second monostable multivibrator including an input terminal and an output terminal; second switch means for connecting any one of said different polarity terminals of said second voltage source to said input terminal of said second monostable multivibrator; a fourth AND gate having two input terminals and an output terminal, one input terminal being connected to said output terminal of said second monostable multivibrator, the output terminal being connected to the other input of said first OR gate; and, third conductor means connected between the other output terminal of said first bistable multivibrator and the other input of said fourth AND gate.

2. A system, according to claim 1, wherein there is included signal generator means for producing a periodic train of signals and logic circuit means, connected between said signal generator means and the input terminal means of said counter means, for gating a preselected number of said signals to said counter.

3. A system, according to claim 2, wherein said logic circuit means is a bistable multivibrator for gating alternate signals to said counter means.

References Cited by the Examiner

UNITED STATES PATENTS

| | | | |
|---|---|---|---|
| 2,172,116 | 9/1939 | Warren | 340—279 |
| 3,188,622 | 6/1965 | Buhler | 340—324 |

ORIS L. RADER, *Primary Examiner.*

LLOYD McCOLLUM, *Examiner.*

L. R. CASSETT, T. J. MADDEN, *Assistant Examiners.*